US011499030B2

(12) United States Patent
Kim et al.

(10) Patent No.: US 11,499,030 B2
(45) Date of Patent: Nov. 15, 2022

(54) PLASTICIZER COMPOSITION AND RESIN COMPOSITION INCLUDING THE SAME

(71) Applicant: LG CHEM, LTD., Seoul (KR)

(72) Inventors: Hyun Kyu Kim, Daejeon (KR); Jeong Ju Moon, Daejeon (KR); Seok Ho Jeong, Daejeon (KR); Mi Yeon Lee, Daejeon (KR); Joo Ho Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/325,688

(22) PCT Filed: Feb. 9, 2018

(86) PCT No.: PCT/KR2018/001776
§ 371 (c)(1),
(2) Date: Feb. 14, 2019

(87) PCT Pub. No.: WO2018/147689
PCT Pub. Date: Aug. 16, 2018

(65) Prior Publication Data
US 2019/0211183 A1    Jul. 11, 2019

(30) Foreign Application Priority Data
Feb. 10, 2017   (KR) .................. 10-2017-0018590

(51) Int. Cl.
*C08K 5/12*     (2006.01)
*C08K 5/11*     (2006.01)
*C08L 101/00*   (2006.01)
*C08F 14/06*    (2006.01)
*C08K 5/00*     (2006.01)

(52) U.S. Cl.
CPC ............. *C08K 5/12* (2013.01); *C08F 14/06* (2013.01); *C08K 5/11* (2013.01); *C08L 101/00* (2013.01); *C08K 5/0016* (2013.01); *C08K 2201/014* (2013.01)

(58) Field of Classification Search
CPC ... C08K 5/12; C08K 5/11; C08F 14/06; C08L 101/00
See application file for complete search history.

(56) References Cited

U.S. PATENT DOCUMENTS

| 9,309,183 | B2 | 4/2016 | Storzum et al. |
| 2007/0179229 | A1 | 8/2007 | Grass |
| 2013/0317152 | A1 | 11/2013 | Becker et al. |
| 2014/0162045 | A1* | 6/2014 | Bourassa ................ C08K 3/22 428/220 |
| 2015/0232411 | A1 | 8/2015 | Storzum et al. |
| 2017/0008252 | A1 | 1/2017 | Fujiwara |
| 2017/0081501 | A1 | 3/2017 | Kim et al. |
| 2017/0088691 | A1 | 3/2017 | Woldt et al. |
| 2018/0022893 | A1 | 1/2018 | Kim et al. |
| 2018/0208541 | A1 | 7/2018 | Boeck et al. |
| 2018/0265672 | A1 | 9/2018 | Kim et al. |
| 2019/0161598 | A1 | 5/2019 | Pfeiffer et al. |

FOREIGN PATENT DOCUMENTS

| CN | 101875747 A | 11/2010 | |
| CN | 101993548 A | 3/2011 | |
| CN | 102959031 A | 3/2013 | |
| CN | 103313847 A | 9/2013 | |
| CN | 104893219 A | 9/2015 | |
| CN | 106232568 A | 12/2016 | |
| CN | 109563305 A | 4/2019 | |
| DE | 102007001540 A1 | 8/2007 | |
| EP | 1808457 A1 | 7/2007 | |
| EP | 3147317 A1 | 3/2017 | |
| EP | 3351526 A1 | 7/2018 | |
| EP | 3476890 B1 | 4/2020 | |
| KR | 10-0957134 B1 | 5/2010 | |
| KR | 10-2014-0005908 A | 1/2014 | |
| KR | 10-2016-0095875 A | 8/2016 | |
| KR | 10-2016-0113034 A | 9/2016 | |
| KR | 10-2016-0124151 A | 10/2016 | |
| KR | 10-2016-0134652 A | 11/2016 | |
| KR | 10-1674317 B1 | 11/2016 | |
| KR | 10-2017-0055360 A | 5/2017 | |
| WO | WO-2015126391 A1 * | 8/2015 | ............... C08K 5/12 |
| WO | 2016/129876 A1 | 8/2016 | |
| WO | 2018024596 A1 | 2/2018 | |

OTHER PUBLICATIONS

English machine translation of CN 101993548. (Year: 2011).*
Allen D. Godwin "28 Plasticizers"; excerpted from the textbook by Myer Kutz (ed.) "Applied Plastics Engineering Handbook", Elsevier / William Andrew Publishing, 2011, pp. 487-501.
Bouchoul, et al. 2017. Thermal and Mechanical Properties of Bio-Based Plasticizers Mixtures On Poly (Vinyl Chloride), Polímeros. vol. 27(3). pp. 237-246.
Søndergaard, et al. 2013. Development Of A Synthetic Pathway For A Sustainable Plasticizer, Centre for Catalysis and Sustainable Chemistry Department of Chemistry, Technical University of Denmark. pp. 1-143.
Bouchareb, et al. 2008. Effects Of Epoxidized Sunflower Oil On The Mechanical and Dynamical Analysis Of The Plasticized Poly(Vinyl Chloride), Journal of Applied Polymer Science, pp. 3442-3450.

(Continued)

*Primary Examiner* — John E Uselding
(74) *Attorney, Agent, or Firm* — Dentons US LLP

(57) ABSTRACT

The present invention relates to a plasticizer composition which includes a terephthalate-based plasticizer and a trimellitate-based plasticizer, selectively includes a citrate-based plasticizer, and does not contain epoxidized oil, and particularly, a plasticizer composition capable of improving physical properties including migration resistance, tensile strength, elongation rate, retention characteristics and low-temperature resistance, required for use as a plasticizer of a resin composition, by improving the problems associated with a conventional plasticizer; and a resin composition including the same.

11 Claims, No Drawings

(56) References Cited

OTHER PUBLICATIONS

Benaniba, et al. 2010. Evaluation Effects of Biobased Plasticizer On The Thermal, Mechanical, Dynamical Mechanical Properties, And Permanence Of Plasticized PVC, Journal of Applied Polymer Science, vol. 118. pp. 3499-3508.

European Patent Office, Opposition Documents regarding EP 3476890B1, "Citation in Opposition procedure—009", dated Apr. 6, 2021 (https://register.epo.org/application?documentId=E6BEZKX60174DSU&number=EP18750908&Ing=en&npl=false).

* cited by examiner

PLASTICIZER COMPOSITION AND RESIN COMPOSITION INCLUDING THE SAME

CROSS-REFERENCE TO RELATED APPLICATION

This application is a National Stage Application of International Application No. PCT/KR2018/001776 filed on Feb. 9, 2018, which claims priority to and the benefit of Korean Patent Application No. 10-2017-0018590, filed on Feb. 10, 2017, the disclosure of which is incorporated herein by reference in its entirety.

TECHNICAL FIELD

The present invention relates to a plasticizer composition and a resin composition including the same.

BACKGROUND ART

Conventionally, a plasticizer forms an ester through a reaction between an alcohol and a polycarboxylic acid such as phthalic acid or adipic acid. In addition, in consideration of domestic and international regulations for phthalate-based plasticizers harmful to humans, there is ongoing research on plasticizer compositions that can replace phthalate-based plasticizers such as terephthalate-, adipate-, and other polymer-based plasticizers.

Meanwhile, in the compound industry requiring high thermal resistance and low volatile loss as main physical properties, considering the required physical properties, a suitable plasticizer should be used. In the case of PCV compounds for a wire and a cable, additives, for example, a plasticizer, a filler, a stabilizer and a flame retardant are added to a PVC resin depending on characteristics required for the corresponding specifications, such as tensile strength, elongation rate, plasticization efficiency, volatile loss, retentions of tensile strength and elongation.

At present, since diisodecyl phthalate (DIDP), which is typically used in wire compound and automobile fabric industries, is an environmental hormone under observation, and is restricted in use according to an environmental issue, a demand for the development of an eco-friendly product to substitute for DIDP is increasing. However, since even many substitutes partially contain a phthalate-based material, they still have environmental problems.

For this reason, studies have been progressing to develop a product of a novel eco-friendly plasticizer composition that has better physical properties than DIDP and thus ensure a vinyl chloride-based resin composition which is free from environmental issues and has excellent quality.

PRIOR ART DOCUMENT

Patent Document (Patent Document 1) Korean Patent No. 10-0957134

DISCLOSURE

Technical Problem

The present invention is directed to providing a plasticizer composition which has excellent plasticization efficiency and migration resistance, is enhanced in tensile strength and elongation rate, the retention of tensile strength and the retention of elongation and has improved low-temperature resistance as a plasticizer applied to a resin composition, and a resin composition including the same.

Technical Solution

To achieve the object, according to an exemplary embodiment, the present invention provides a plasticizer composition, which includes a terephthalate-based plasticizer in which each of two alkyl groups bound to a diester group independently has 4 to 10 carbon atoms; and a trimellitate-based plasticizer represented by Formula 1 below; and does not include epoxidized oil.

[Formula 1]

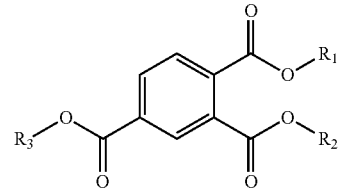

In Formula 1, $R_1$ to $R_3$ are each independently an alkyl group having 4 to 10 carbon atoms.

To achieve the object, according to an exemplary embodiment, the present invention provides a resin composition, which includes 100 parts by weight of a resin; and 5 to 150 parts by weight of the above-described plasticizer composition.

Advantageous Effects

When being used in a resin composition, a plasticizer composition of the present invention can be expected to have excellent plasticization efficiency and improved migration resistance and reduced volatile loss and enhanced low-temperature resistance, as well as enhanced tensile strength, elongation rate, retention of tensile strength and retention of elongation.

MODES OF THE INVENTION

Hereinafter, the present invention will be described in further detail to help in understanding of the present invention.

The terms and words used in the specification and the claims should not be interpreted as being limited to conventional or literal meanings, but should be interpreted with meanings and concepts which are consistent with the technological scope of the invention based on the principle that the inventors have appropriately defined concepts of terms in order to describe the invention in the best way.

Plasticizer Composition Including 2 or 3 Types of Plasticizers

According to an exemplary embodiment of the present invention, a plasticizer composition includes two or more types of plasticizers, necessarily including: a terephthalate-based plasticizer in which each of two alkyl groups bound to a diester group independently has 4 to 10 carbon atoms; and a trimellitate-based plasticizer represented by Formula 1; but no epoxidized oil.

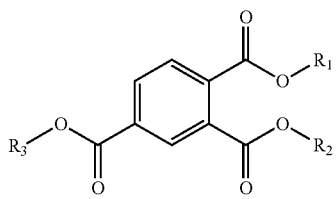

[Formula 1]

In Formula 1, $R_1$ to $R_3$ are each independently an alkyl group having 4 to 10 carbon atoms.

When the terephthalate-based plasticizer and the trimellitate-based plasticizer are included in the plasticizer composition, the upper limit of a weight ratio of the two materials may be 99:1, 95:5, 90:10, 85:15, 80:20, 70:30 or 60:40, and the lower limit of a weight ratio of the two materials may be 1:99, 5:95, 10:90, 15:85, 20:80, 30:70 or 40:60. The weight ratio of the two materials is preferably 90:10 to 10:90, and more preferably 70:30 to 10:90.

The plasticizer composition may include three types of plasticizers, and in this case, may further include a citrate-based plasticizer represented by Formula 2 below, in addition to the above-mentioned plasticizers.

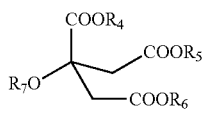

[Formula 2]

In Formula 2, $R_4$ to $R_6$ are each independently an alkyl group having 5 to 9 carbon atoms, and $R_7$ is hydrogen.

When the plasticizer composition consists of three types of plasticizers, the terephthalate-based plasticizer and the trimellitate-based plasticizer may be included at the same weight ratio as when a plasticizer composition is prepared of only the two types of plasticizers, and the citrate-based plasticizer may be included at 5 to 150 parts by weight, and preferably 10 to 100 parts by weight, with respect to 100 parts by weight of the sum of the weights of the terephthalate-based plasticizer and the trimellitate-based plasticizer.

When three types of plasticizers are included in the plasticizer composition as described above, and a mixing ratio of the plasticizers satisfies the above-mentioned range, migration resistance may be improved, and the enhancement of the retention of tensile strength, an elongation rate, and plasticization efficiency is expected.

The plasticizer composition according to an exemplary embodiment of the present invention is a plasticizer composition which does not contain epoxidized oil, that is, epoxidized oil. Here, the phrase "does not contain epoxidized oil" means the exclusion of the application of epoxidized oil as a component of the plasticizer composition, and may also mean, even when the plasticizer composition is mixed with a resin in processing, epoxidized oil may be contained in the resin composition at less than 1 part by weight with respect to 100 parts by weight of the plasticizer composition.

While the epoxidized oil may have specific effects because of a property such as thermal resistance or oil resistance, a phenomenon in which a liquid plasticizer becomes a slurry at a low temperature, for example, approximately −5° C. or less, may occur, thereby causing a big problem in the storage and transfer of a product. Accordingly, when the resin is processed using the epoxidized oil-containing plasticizer, the transfer, delivery and processing of the plasticizer composition, and the low-temperature resistance characteristic of the resin composition probably deteriorate.

Further, when the epoxidized oil is contained in the plasticizer when being applied to a product requiring insulation performance, other than the above-mentioned problems, a phenomenon in which volume resistance is reduced may occur, compared with an eco-friendly plasticizer composition without a conventional phthalate product and epoxidized oil.

Therefore, to solve the above-mentioned problems, the plasticizer composition according to the present invention necessarily includes a terephthalate-based material and a trimellitate-based material as described above, epoxidized oil is not included, and a citrate-based material may selectively be further included. As described above, when the epoxidized oil is not included, a low-temperature storage characteristic may be greatly enhanced, and it can be expected that insulation performance is improved due to enhanced low-temperature resistance and volume resistance of the prepared resin product.

Terephthalate-Based Plasticizer

The terephthalate-based plasticizer according to an exemplary embodiment of the present invention may have two alkyl groups bound to a diester group, wherein each alkyl group has 4 to 10 carbon atoms, preferably 6 to 9 carbon atoms, and more preferably 7 to 9 carbon atoms. The terephthalate-based plasticizer is the most useful plasticizer that can substitute for a phthalate-based plasticizer, exhibits the same levels of basic mechanical properties as compared with a conventional phthalate-based plasticizer, and therefore can be applied as an eco-friendly plasticizer.

In addition, each of the two alkyl groups bound to the diester group of the terephthalate-based plasticizer may be, for example, a normal butyl group, an isobutyl group, a normal pentyl group, an isopentyl group, a normal hexyl group, a normal heptyl group, an isoheptyl group, a normal octyl group, an isooctyl group, a 2-ethylhexyl group, a normal nonyl group, an isononyl group, a 2-propylheptyl group or an isodecyl group, and preferably, a normal butyl group, an isopentyl group, an isoheptyl group, a 2-ethylhexyl group, an isononyl group, a 2-propylheptyl group or an isodecyl group.

Specifically, for example, the terephthalate-based plasticizer may be dibutyl terephthalate (DBTP), diisopentyl terephthalate (DIPTP), dihexyl terephthalate (DHxTP), diisoheptyl terephthalate (DIHTP), di(2-ethylhexyl) terephthalate (DEHTP), diisononyl terephthalate (DINTP), di(2-propylheptyl) terephthalate (DPHTP), diisodecyl terephthalate (DIDTP), (2-ethylhexyl)isononyl terephthalate (EHINTP), (2-ethylhexyl)(2-propylheptyl) terephthalate, isononyl(2-propylheptyl) terephthalate, isodecyl isononyl terephthalate, (2-ethylhexyl)isodecyl terephthalate, isodecyl (2-propylheptyl) terephthalate, butyl(2-ethylhexyl) terephthalate, isoheptyl (2-ethylhexyl) terephthalate, isopentyl isononyl terephthalate, isopentyl(2-ethylhexyl) terephthalate, isopentyl(2-propylheptyl) terephthalate or butyl isoheptyl terephthalate.

Regarding the preparation method, the terephthalate-based plasticizer maybe prepared by direct esterification of terephthalic acid and one or more alcohols, or trans-esterification of a dialkyl terephthalate and an alcohol.

That is, the alcohol is a primary alcohol, in which an alkyl group may be selected from the group consisting of a normal butyl group, an isobutyl group, a normal pentyl group, an isopentyl group, a normal hexyl group, a normal heptyl group, an isoheptyl group, a normal octyl group, an isooctyl group, a 2-ethylhexyl group, a normal nonyl group, an isononyl group, a 2-propylheptyl group or an isodecyl group as described above. When one type of alcohol is applied to direct esterification, a single terephthalate may be applied, or when a mixture of two or more alcohol is applied to direct esterification or subjected to trans-esterification, a mixture of two or more types of terephthalates may be applied.

Specifically, when the trans-esterification is performed and a terephthalate mixture-based plasticizer is applied, the terephthalates may be included at a specific composition ratio in the terephthalate mixture-based plasticizer. For example, the terephthalate mixture may be prepared through trans-esterification using di(alkyl A) terephthalate having alkyl A as an alkyl group and (alkyl B) alcohol having alkyl B as an alkyl group as reactants, in which 3.0 to 99.0 mol % of di(alkyl A)terephthalate, 0.5 to 96.5 mol % of (alkyl A)(alkyl B)terephthalate and 0.5 to 96.5 mol % of di(alkyl B)terephthalate are included.

The composition ratio may be a mixing composition ratio produced by esterification, or a composition ratio intentionally determined by additionally mixing a specific compound(s), and the composition ratio may be properly adjusted according to a desired physical property.

Trimellitate-Based Plasticizer

According to an exemplary embodiment of the present invention, the plasticizer composition may include a trimellitate-based plasticizer, and the trimellitate-based plasticizer may be represented by Formula 1 below.

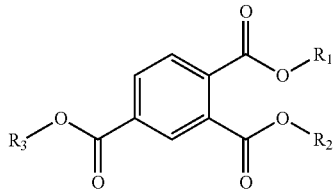

[Formula 1]

In Formula 1, $R_1$ to $R_3$ are each independently an alkyl group having 4 to 10 carbon atoms.

The trimellitate-based plasticizer is a material capable of compensating for a terephthalate-based plasticizer as described above and may complement a characteristic of the terephthalate-based plasticizer, such as migration resistance or a loss characteristic, which is an effect that is not achieved, compared with a phthalate-based plasticizer, and may improve overall physical properties.

$R_1$ to $R_3$ of Formula 1 may have 4 to 10 carbon atoms, and each of $R_1$ to $R_3$ may be the same. If $R_1$ to $R_3$ are different from each other, two of $R_1$ to $R_3$ are the same, but the other is a different alkyl group. For example, the alkyl group may be selected from a normal butyl group, an isobutyl group, a normal pentyl group, an isopentyl group, a normal hexyl group, a normal heptyl group, an isoheptyl group, a normal octyl group, an isooctyl group, a 2-ethylhexyl group, a normal nonyl group, an isononyl group, a 2-propylheptyl group or an isodecyl group.

In addition, when a normal alkyl group, that is, a linear alkyl group, among the above-mentioned alkyl groups, is applied, it has been known that the plasticizer has an excellent characteristic such as low-temperature resistance, but commercially, a branched isoalkyl group is excellent in terms of economic feasibility. In the case of the trimellitate-based plasticizer, when an alkyl group having the above-mentioned number of carbon atoms is applied, an effect of improving plasticization efficiency, migration resistance, volatile loss, the retentions of elongation and stress migration may be expected.

Citrate-Based Plasticizer

According to an exemplary embodiment of the present invention, the plasticizer composition may include the terephthalate-based plasticizer and a trimellitate-based plasticizer, and further include a citrate-based plasticizer as a third mixture. The citrate-based plasticizer may be represented by Formula 2 below.

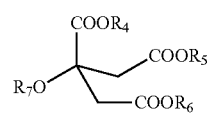

[Formula 2]

In Formula 2, $R_4$ to $R_6$ are each independently an alkyl group having 5 to 9 carbon atoms, and $R_7$ is hydrogen.

In the case of the citrate-based plasticizer, $R_4$ to $R_6$ of Formula 2 may be each independently a pentyl group, an isopentyl group, a hexyl group, an isohexyl group, a heptyl group, an isoheptyl group, a normal octyl group, a 2-ethylhexyl group, a normal nonyl group or an isononyl group, and $R_4$ to $R_6$ may be the same or different from each other.

The citrate in which $R_4$ to $R_6$ are different alkyl groups having 5 to 9 carbon atoms may be, for example, a citrate having a combined substituent of an isononyl group and a 2-propylheptyl group, a citrate having a combined substituent of a 2-ethylhexyl group and a 2-propylheptyl group, or a citrate having a combined substituent of an isodecyl group and a 2-ethylhexyl group, in addition to other citrates in which $R_4$ to $R_6$ have 5 to 9 carbon atoms, and which have a combined substituent of two alkyl groups having different numbers of carbon atoms. Here, the alkyl group may be linear or branched.

The citrate in which $R_4$ to $R_6$ are different alkyl groups having 5 to 9 carbon atoms may be, for example, a citrate having a combined substituent of an isopentyl group and an isononyl group, a citrate having a combined substituent of 2-ethylhexyl group and an isononyl group, or a citrate having a combined substituent of an isopentyl group and a 2-ethylhexyl group, or it may be any other citrate in which $R_4$ to $R_6$ have 5 to 9 carbon atoms and which have a combined substituent of two alkyl groups having different numbers of carbon atoms. Here, the alkyl group may be linear or branched.

The citrate in which $R_4$ to $R_6$ are the same alkyl groups having 5 to 9 carbon atoms may be, for example, triisopentyl citrate (TIPC), trihexyl citrate (THxC), triheptyl citrate (THpC), triisoheptyl citrate (TiHpC), tri(2-ethylhexyl) citrate (TEHC), or triisononyl citrate (TINC), or any other citrate in which $R_4$ to $R_6$ are alkyl groups having 5 to 9 carbon atoms.

Preferably, when an alkyl group having 5 or more carbon atoms is applied and an alcohol having 5 to 9 carbon atoms, rather than those having more carbon atoms, even by a use of a small amount of such a plasticizer, the same or higher effects in plasticization efficiency, absorption rate, etc. may be exhibited. In addition, it is preferable that the upper limit of the number of carbon atoms of the alkyl group be 9, and when the number of carbon atoms exceeds 9, due to an excessive increase in molecular weight, there is a concern about the deterioration of characteristics such as an absorption rate, plasticization efficiency, etc.

Meanwhile, when an acetyl group is present in the citrate-based plasticizer, that is, when $R_7$ is an acetyl group, a physical property of the plasticizer, particularly plasticization efficiency may be deteriorated, and additional equipment costs for treating waste citric acid generated as a byproduct even in a manufacturing process may be needed. When an acetyl group is introduced as described above, there may be considerations such as the addition of process steps and the increase in production costs due to the treatment of a byproduct.

In other words, when $R_7$ of Formula 2 in the citrate-based plasticizer is an acetyl group, rather than hydrogen, problems of reduced plasticization efficiency, the addition of an increased amount of the plasticizer to overcome the reduced efficiency, and an increased product cost thereby may accompany, and therefore, the citrate-based plasticizer in which $R_7$ is an acetyl group may not be superior to the plasticizer in which $R_7$ is hydrogen in various aspects such as marketability, economic feasibility and physical properties.

Preparation Method

In the present invention, a method for preparing the plasticizer composition may be a blending method, and a composition may be prepared by a process of preparing a terephthalate-based plasticizer, a citrate-based plasticizer, and a trimellitate-based plasticizer independently, and then mixing them together.

When the terephthalate-based plasticizer is prepared by direct esterification, a process of reacting one or more of butyl alcohol, isopentyl alcohol, hexyl alcohol, isoheptyl alcohol, 2-ethylhexyl alcohol, isononyl alcohol and 2-propylheptyl alcohol with terephthalic acid may be performed.

The direct esterification may be performed by adding terephthalic acid to an alcohol and adding a catalyst to induce a reaction under a nitrogen atmosphere; removing an unreacted alcohol and neutralizing an unreacted acid; and performing dehydration and filtration through vacuum distillation.

In addition, the alcohol may be used at 150 to 500 mol %, 200 to 400 mol %, 200 to 350 mol %, 250 to 400 mol %, or 270 to 330 mol % with respect to 100 mol % of terephthalic acid.

Meanwhile, the catalyst used in the esterification may be, for example, one or more selected from acid catalysts such as sulfuric acid, hydrochloric acid, phosphoric acid, nitric acid, para-toluene sulfonic acid, methane sulfonic acid, ethane sulfonic acid, propane sulfonic acid, butane sulfonic acid, and alkyl sulfuric acid, metal salts such as aluminum sulfate, lithium fluoride, potassium chloride, cesium chloride, calcium chloride, iron chloride and aluminum phosphate, metal oxides such as a heteropoly acid, natural/synthetic zeolites, cation and anion exchange resins, and organic metals such as a tetraalkyl titanate and a polymer thereof. Preferably, the catalyst is a tetraalkyl titanate.

An amount of the catalyst used herein may vary according to its type, and as an example, a homogeneous catalyst may be used in a range of 0.01 to 5 wt %, 0.01 to 3 wt %, 1 to 5 wt % or 2 to 4 wt % with respect to 100 wt % of the total reactants, and a heterogeneous catalyst may be used in a range of 5 to 200 wt %, 5 to 100 wt %, 20 to 200 wt %, or 20 to 150 wt % with respect to the total weight of the reactants.

Here, the reaction temperature may be in a range of 180 to 280° C., 200 to 250° C., or 210 to 230° C.

To prepare the terephthalate-based plasticizer in a mixture, terephthalate compounds are prepared through direct esterification as described above and then mixed together, or two or more types of alcohols may be applied in the direct esterification. Alternatively, a terephthalate compound may be prepared through trans-esterification in which a terephthalate compound such as di(2-ethylhexyl) terephthalate or diisononyl terephthalate is reacted with alcohols such as butyl alcohol, isopentyl alcohol, hexyl alcohol, isoheptyl alcohol and 2-propylheptyl alcohol, and in this case, the order of introducing such alcohols may be changed depending on the preparation method. For example, a product prepared by the reaction between di(2-ethylhexyl) terephthalate and butyl alcohol is not much different from a product prepared by the reaction between dibutyl terephthalate and 2-ethylhexyl alcohol, and it may also be possible to obtain a product with the same content ratio as that of the product prepared by the reaction between dibutyl terephthalate and 2-ethylhexyl alcohol by controlling reaction conditions and conversion rates.

The term "trans-esterification" used herein refers to a reaction between an alcohol and an ester in which R" of an ester is interchanged with R' of an alcohol as shown in Reaction Scheme 1:

[Reaction Scheme 1]

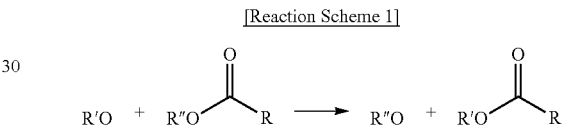

According to an exemplary embodiment of the present invention, when the trans-esterification is performed, three types of ester compositions may be produced according to three cases in which an alkoxide of an alcohol attacks carbons of two ester (RCOOR") groups present in an ester-based compound; an alkoxide of an alcohol attacks carbons of one ester (RCOOR") group present in an ester-based compound; and no reaction is performed.

In addition, compared with acid-alcohol esterification, the trans-esterification does not cause a waste water problem, and may be performed without a catalyst, and therefore problems caused by the use of an acid catalyst may be solved.

For example, by the trans-esterification between di(2-ethylhexyl)terephthalate and isononyl alcohol, a mixture of di(2-ethylhexyl)terephthalate, (2-ethylhexyl)isononyl terephthalate and diisononyl terephthalate may be produced, and the three types of terephthalates may be respectively formed at 3.0 wt % to 70 wt %, 0.5 wt % to 50 wt % and 0.5 wt % to 85 wt %, and specifically, 10 wt % to 50 wt %, 0.5 wt % to 50 wt % and 35 wt % to 80 wt %, with respect to the total weight of the mixture.

In addition, a composition ratio of a mixture prepared by the trans-esterification may be controlled according to an amount of the alcohol added.

The amount of the alcohol added may be 0.1 to 89.9 parts by weight, specifically, 3 to 50 parts by weight, and more specifically 5 to 40 parts by weight with respect to 100 parts by weight of the terephthalate compound.

As the amount of the alcohol added increases, a mole fraction of the terephthalate compound participating in the trans-esterification may be increased, and thus a content of two terephthalate compounds as products in the mixture may increase. Accordingly, a content of an unreacted terephthalate compound may tend to decrease.

According to an exemplary embodiment of the present invention, a molar ratio of the terephthalate compound and an alcohol, which are reactants, may be, for example, 1:0.005 to 1:5.0, 1:0.05 to 1:2.5, or 1:0.1 to 1:1, and within this range, process efficiency is high and an ester-based plasticizer composition with improved processability may be obtained.

However, a composition ratio of at which the three types of terephthalate-based plasticizers are mixed is not limited to the above-mentioned range. The composition ratio may be changed by adding any one of the three types of terephthalates, and possible composition ratios are as described above.

According to an exemplary embodiment of the present invention, the trans-esterification may be performed at a reaction temperature of 120 to 190° C., preferably 135 to 180° C., more preferably 141 to 179° C. for 10 minutes to 10 hours, preferably 30 minutes to 8 hours, and more preferably 1 to 6 hours. Within the above-mentioned temperature and time ranges, the terephthalate-based plasticizer, which is in the form of a mixture with a desired composition ratio, may be effectively obtained. Here, the reaction time may be calculated from the point of time at which the reactants reach the reaction temperature by heating.

The trans-esterification may be performed in the presence of an acid catalyst or a metal catalyst, which provides an effect of reducing the reaction time.

The acid catalyst may be, for example, sulfuric acid, methane sulfonic acid, or p-toluene sulfonic acid, and the metal catalyst may be, for example, an organometallic catalyst, a metal oxide catalyst, a metal salt catalyst or a metal itself.

The metal component may be, for example, any one selected from the group consisting of tin, titanium and zirconium or a mixture of two or more thereof.

The direct esterification and the trans-esterification may also be used to prepare the above-described citrate-based plasticizer (using citric acid instead of terephthalic acid) and trimellitate-based plasticizer (using trimellitic acid instead of terephthalic acid). In this case, like the terephthalate-based plasticizer, the citrate-based plasticizer or trimellitate-based plasticizer may also be prepared in the form of a mixture with a predetermined composition ratio, and the composition ratio of the mixture produced may be controlled by adjusting the content of an alcohol as a reaction material. Other details of preparing a citrate or trimellitate through direct esterification or trans-esterification may be the same as those applied to the preparation of the terephthalate-based plasticizer.

In addition, as above-mentioned reaction materials, terephthalic acid, citric acid and trimellitic acid, which are carboxylic acid-based materials, may be substituted with an acid anhydride.

Meanwhile, the plasticizer composition may be prepared by preparing each component independently and then blending the components, or through simultaneous esterification of a mixture of the components.

Specifically, when alkyl groups having the same number of carbon atoms are intended to be applied to the terephthalate-based plasticizer, citrate-based plasticizer and trimellitate-based plasticizer, the plasticizer may be prepared through direct esterification of an acid mixture of terephthalic acid, citric acid and trimellitic acid with an alcohol having a specific alkyl group, and in this case, a plasticizer composition in which the alkyl groups of the terephthalate, the citrate and the trimellitate have the same number of carbon atoms may be obtained.

That is, when the same alcohol is used, a simultaneous reaction between two or more acids or acid anhydrides and an alcohol may be a commercially economical method.

According to another exemplary embodiment of the present invention, there is provided a resin composition prepared by mixing 5 to 150 parts by weight, 20 to 100 parts by weight, 30 to 80 parts by weight or 40 to 70 parts by weight of the plasticizer composition prepared as described above with respect to 100 parts by weight of a resin, with the resin.

The resin may be selected from ethylene vinyl acetate, polyethylene, polypropylene, polyketone, polyvinyl chloride, polystyrene, polyurethane, and a thermoplastic elastomer.

In addition, the resin composition may be mixed with various additives such as a thermal stabilizer, a stabilizer, a lubricant, a filler, etc., and the type or content thereof may be determined as known in the art.

The resin composition prepared as described above may provide a resin composition effective in both of calendering and compound formulation, and the resin composition may be applied in, for example, the manufacture of wires, flooring materials, interior materials for automobiles, films, sheets, or tubes.

EXAMPLES

Hereinafter, to explain the present invention in detail, the present invention will be described in detail with reference to examples. However, examples according to the present invention may be modified in a variety of different forms, and the scope of the present invention should not be construed as being limited to the examples to be described below. The exemplary embodiments of the present invention are provided for those of ordinary skill in the art to more fully understand the present invention.

Preparation of Terephthalate-Based Material

Preparation Example 1: Preparation of di(2-ethylhexyl) terephthalate (DEHTP)

498.0 g of purified terephthalic acid (PTA), 1,170 g of 2-ethylhexyl alcohol (2-EH; a molar ratio of TPA:2-EH=1.0:3.0), and 1.54 g of a titanium-based catalyst (tetra isopropyl titanate (TIPT); 0.31 parts by weight with respect to 100 parts by weight of TPA) as a catalyst were added to a 4-neck 3 L reaction vessel equipped with a cooler, a condenser, a decanter, a reflux pump, a temperature controller, an agitator, etc., and a temperature was slowly increased to approximately 170° C. At approximately 170° C., water was generated, and esterification was performed for approximately 4.5 hours at a reaction temperature of approximately 220° C. under atmospheric pressure while a nitrogen gas was continuously introduced, and then the reaction was terminated when an acid value reached 0.01.

After the reaction was completed, distillation extraction was performed for 0.5 to 4 hours under reduced pressure to remove unreacted components. To remove unreacted components to a predetermined content level or less, steam extraction was performed for 0.5 to 3 hours under reduced pressure using steam, and neutralization was performed using an alkali solution after a reaction solution was cooled to approximately 90° C. Additionally, washing could be performed, and then the reaction solution was dehydrated to remove moisture. Filter media were input to the dehydrated reaction solution, stirred for a predetermined time and then filtered, thereby finally obtaining 1,326.7 g of DEHTP (yield: 99.0%).

Preparation Example 2: Preparation of Diisononyl Terephthalate (DINTP)

Diisononyl terephthalate was prepared in the same manner as in Preparation Example 1, except that, instead of 2 ethylhexyl alcohol, 1.296 g of isononyl alcohol was used in esterification.

Preparation Example 3: Preparation of Di(2-Propylheptyl) Terephthalate (DPHTP)

Di(2-propylheptyl) terephthalate was prepared in the same manner as in Preparation Example 1, except that, instead of 2-ethylhexyl alcohol, 1,422 g of 2-propylheptyl alcohol was used in esterification.

Preparation Example 4: Preparation of Dibutyl Terephthalate (DBTP)

Dibutyl terephthalate was prepared in the same manner as in Preparation Example 1, except that, instead of a low temperature reaction was carried out using 2-ethylhexyl alcohol, 670 g of normal butyl alcohol and 5 g of methane sulfonic acid catalyst.

Here, the time to end the reaction was determined according to predetermined G.C. and acid values.

Preparation Example 5: Preparation of Diisopentyl Terephthalate (DIPTP)

Diisopentyl terephthalate was prepared in the same manner as in Preparation Example 1, except that, instead of 2-ethylhexyl alcohol, 792 g of isopentyl alcohol was used in esterification.

Preparation Example 6: Preparation of Dihexyl Terephthalate (DHxTP)

Dihexyl terephthalate was prepared in the same manner as in Preparation Example 1, except that, instead of 2-ethylhexyl alcohol, 918 g of normal hexyl alcohol was used in esterification.

Preparation of Trimellitate-Based Material

Preparation Example 7: Preparation of Tributyl Trimellitate (TBTM)

1,112 g of a tributyl trimellitate product (yield: 98%) was finally obtained using 576.3 g of anhydrous trimellitic acid and 866 g of n-butyl alcohol as reaction materials.

Preparation Example 8: Preparation of Triisopentyl Trimellitate (TIPTM)

1,236 g of triisopentyl trimellitate product (yield: 98%) was finally obtained using 576.3 g of anhydrous trimellitic acid and 1,030 g of isopentyl alcohol as reaction materials.

Preparation Example 9: Preparation of Trihexyl Trimellitate (THxTM)

1,360 g of a trihexyl trimellitate product (yield: 98%) was finally obtained using 576.3 g of anhydrous trimellitic acid and 1,196 g of hexyl alcohol as reaction materials.

Preparation Example 10: Preparation of tri(2-ethylhexyl) trimellitate (TEHTM)

1,607 g of a tri(2-ethylhexyl) trimellitate product (yield: 98%) was finally obtained using 576.3 g of anhydrous trimellitic acid and 1,521 g of 2-ethylhexyl alcohol as reaction materials.

Preparation Example 11: Preparation of Triisononyl Trimellitate (TINTM)

1,731 g of a triisononyl trimellitate product (yield: 98%) was finally obtained using 576.3 g of anhydrous trimellitic acid and 1,685 g of isononyl alcohol as reaction materials.

Preparation Example 12: Preparation of Tri(2-Propylheptyl) Trimellitate (TPHTM)

1,855 g of a tri(2-propylheptyl) trimellitate product (yield: 98%) was finally obtained using 576.3 g of anhydrous trimellitic acid and 1,852 g of 2-propylheptyl alcohol as reaction materials.

Preparation of Citrate-Based Material

Preparation Example 13: Preparation of Triisopentyl Citrate (TIPC)

1,183 g of triisopentyl citrate (yield: 98%) was finally obtained using 576 g of citric acid and 1,030 g of isopentyl alcohol as reaction materials.

Preparation Example 14: Preparation of Trihexyl Citrate (THxC)

1,307 g of trihexyl citrate (yield: 98%) was finally obtained using 576 g of citric acid and 1,196 g of hexyl alcohol as reaction materials.

Preparation Example 15: Preparation of tri(2-ethylhexyl) citrate (TEHC)

1,554 g of tri(2-ethylhexyl) citrate (yield: 98%) was finally obtained using 576 g of citric acid and 1,521 g of 2-ethylhexyl alcohol as reaction materials.

Preparation Example 16: Preparation of Triisononyl Citrate (TINC)

1,679 g of triisononyl citrate (yield: 98%) was finally obtained using 576 g of citric acid and 1,685 g of isononyl alcohol as reaction materials.

Plasticizer compositions of the examples were prepared by mixing the materials prepared in Preparation Examples 1 to 16, the plasticizer compositions of the examples and comparative examples were summarized in Tables 1 and 2, and evaluation of the physical properties of the plasticizer compositions was performed according to the following test items. All materials, other than the materials prepared in the preparation examples, are products manufactured by LG Chem, Ltd. or commercially available products.

TABLE 1

|  | Plasticizer A | Plasticizer B | Plasticizer C |
|---|---|---|---|
| Example 1-1 | DEHTP 50 | TINTM 50 | — |
| Example 1-2 | DEHTP 90 | TPHTM 10 | — |
| Example 1-3 | DINTP 60 | THxTM 40 | — |
| Example 1-4 | DPHTP 30 | THxTM 70 | — |
| Example 1-5 | DHxTP 40 | TEHTM 60 | — |
| Example 1-6 | DIPTP 80 | TINTM 20 | — |
| Example 1-7 | DINTP 20 | TIPTM 80 | — |
| Example 1-8 | DPHTP 10 | THxTM 90 | — |
| Example 1-9 | DBTP 10 | TINTM 90 | — |
| Example 1-10 | GL100[1] 70 | THxTM 30 | — |
| Example 1-11 | GL520[2] 40 | TINTM 60 | — |
| Comparative Example 1-1 | DIDP[3] 100 | — | — |
| Comparative Example 1-2 | DEHTP 100 | — | — |
| Comparative Example 1-3 | — | TPHTM 100 | — |
| Comparative Example 1-4 | DEHTP 50 | TINTM 50 | ESO[4] |
| Comparative Example 1-5 | DINTP 60 | THxTM 40 | ESO[4] |

[1]GL100 (LG Chem, Ltd.): Terephthalate composition including diisononyl terephthalate, isononyl(2-ethylhexyl) terephthalate and di(2-ethylhexyl) terephthalate at a weight ratio of approximately 10:50:40
[2]GL520 (LG Chem, Ltd.): Terephthalate composition including dibutyl terephthalate, butyl(2-ethylhexyl) terephthalate and di(2-ethylhexyl) terephthalate at a weight ratio of approximately 5:25:70
[3]DIDP: Diiodecyl phthalate
[4]Addition of 20 parts by weight of epoxidized soybean oil (ESO) with respect to 100 parts by weight of the sum of weights of plasticizer A and plasticizer B

TABLE 2

|  | Plasticizer A | Plasticizer B | Plasticizer C (parts by weight)[1] |
|---|---|---|---|
| Example 2-1 | DEHTP 62.5 | TEHTM 37.5 | TEHC 25 |
| Example 2-2 | DEHTP 37.5 | TEHTM 62.5 | THxC 25 |
| Example 2-3 | DEHTP 66.7 | TINTM 33.3 | THxC 67 |
| Example 2-4 | DEHTP 50 | THxTM 50 | TEHC 67 |
| Example 2-5 | DINTP 77.8 | TBTM 22.2 | TIPC 11 |
| Example 2-6 | DINTP 40 | TIPTM 60 | TIPC 100 |
| Example 2-7 | DPHTP 11.1 | THxTM 88.9 | TINC 11 |
| Example 2-8 | GL520 85.7 | TPHTM 14.3 | TEHC 43 |
| Comparative Example 2-1 | DIDP 100 | — | — |
| Comparative Example 2-2 | DINTP 100 | — | TINC 25 |
| Comparative Example 2-3 | DPHTP 100 | — | TEHC 43 |
| Comparative Example 2-4 | DEHTP 66.7 | TINTM 33.3 | ATHxC[2] 67 |

[1]Content with respect to 100 parts by weight of the total weight of a mixture of plasticizer A and plasticizer B
[2]ATHxC: Acetyl trihexyl citrate <Test Items>

Measurement of Hardness

Shore hardness (Shore "A") was measured at 25° C. under conditions of 3T and 10s according to ASTM D2240.

Measurement of Tensile Strength

According to ASTM D638, each specimen was pulled at a cross head speed of 200 mm/min (1T) using a tester U.T.M (Manufacturer; Instron, Model No.; 3345), until the specimen was broken. Tensile strength was calculated as follows:

Tensile strength (kgf/cm$^2$)=[Load value (kgf)/Thickness (cm)]×Width (cm)

Measurement of Elongation Rate

According to ASTM D638, each specimen was pulled at a cross head speed of 200 mm/min (1T) using U.T.M until the specimen was broken. An elongation rate was calculated as follows:

Elongation rate (%)=(Length after elongation/Initial length)×100

Measurement of Migration Loss

An experimental specimen having a thickness of 2 mm or more was obtained according to KSM-3156, and a glass plate and wax paper were attached to both sides of the specimen, respectively, followed by applying a load of 2 kgf/cm$^2$. The specimen was maintained in a forced convection oven (80° C.) for 72 hours, then taken out of the oven, and cooled at room temperature for 4 hours. Afterward, following the removal of the glass plate and the wax paper attached to both sides of the specimen, the weights of the specimen before and after the maintenance in the oven were measured to calculate a migration loss by the equation below.

Migration loss (%)=[(Initial weight of specimen at room temperature−Weight of specimen after being maintained in oven)/Initial weight of specimen at room temperature]×100

Measurement of Retentions of Tensile Strength and Elongation

Measurement of the retentions of tensile strength and elongation was carried out by applying heat to specimens at 121° C. for 168 hours and measuring the retentions of tensile strength and elongation in the specimens, and measurement methods are the same as those for tensile strength and an elongation rate.

Measurement of Low-Temperature Resistance

Temperatures at which three of five specimens previously manufactured were broken by an impact after they had been maintained at a specific temperature for 3 minutes were measured.

Experimental Example 1: Evaluation of Physical Properties 1

Specimens were manufactured using mixed plasticizer compositions of the examples and comparative examples listed in Tables 1 and 2.

To manufacture a specimen, referring to ASTM D638, with respect to 100 parts by weight of a polyvinyl chloride resin (PVC (LS100)), 50 parts by weight of each of the plasticizer compositions prepared in the examples and the comparative examples, 5 parts by weight of RUP 144 (Adeka Korea Co., Ltd.) as a stabilizer, 40 parts by weight of Omya 1T (Omya Inc.) as a filler, and 0.3 part by weight of St-A (Isu Chemical, Co., Ltd.) as a lubricant were blended and mixed at 700 rpm and 98° C. Specimens were manufactured by processing the mixture using a roll mill at 160° C. for 4 minutes, and compressing the resulting product using a press at 180° C. for 3 minutes (low pressure) and 2.5 minutes (high pressure).

The specimens were evaluated for each of the test items, and the results are shown in Table 3 below.

TABLE 3

|  | Hardness (Shore "A") | Tensile strength (kg/cm²) | Retention of tensile strength (%) | Elongation rate (%) | Retention of elongation (%) | Low temperature resistance (° C.) |
|---|---|---|---|---|---|---|
| Example 1-1 | 92.0 | 164.3 | 111.6 | 301.3 | 78.5 | −29 |
| Example 1-2 | 90.3 | 170.2 | 102.4 | 306.8 | 86.4 | −32 |
| Example 1-3 | 89.2 | 172.6 | 105.0 | 314.5 | 96.4 | −32 |
| Example 1-4 | 89.3 | 170.1 | 102.0 | 300.2 | 93.4 | −31 |
| Example 1-5 | 90.6 | 165.9 | 98.2 | 295.6 | 92.3 | −33 |
| Example 1-6 | 88.5 | 167.5 | 96.7 | 290.3 | 80.6 | −35 |
| Example 1-7 | 89.2 | 170.3 | 102.0 | 304.6 | 94.2 | −32 |
| Example 1-8 | 89.0 | 172.0 | 98.8 | 310.5 | 92.6 | −33 |
| Example 1-9 | 92.8 | 162.4 | 105.6 | 298.5 | 83.6 | −29 |
| Example 1-10 | 89.0 | 177.5 | 97.8 | 295.7 | 95.8 | −36 |
| Example 1-11 | 90.7 | 198.7 | 98.7 | 314.8 | 88.5 | −29 |
| Comparative Example 1-1 | 91.3 | 158.7 | 95.6 | 280.1 | 74.3 | −28 |
| Comparative Example 1-2 | 91.6 | 143.6 | 78.5 | 270.3 | 65.3 | −30 |
| Comparative Example 1-3 | 96.8 | 170.3 | 98.3 | 255.6 | 92.3 | −25 |

Referring to Table 3, it was confirmed that the examples of the present invention, which were prepared by suitably controlling the number of carbon atoms to 4 to 10 and a content ratio of a terephthalate-based plasticizer and a trimellitate-based plasticizer, exhibited considerably improved performance as compared with Comparative Example 1-1 and Comparative Example 1-2, which are conventional products, exhibited exceptionally enhanced performance in all aspects as compared with a DEHTP (Comparative Example 1-2) plasticizer which has been widely used as an eco-friendly product, and were identified as plasticizers with higher performance than a DIDP plasticizer (Comparative Example 1-1), which causes an environmental problem. Therefore, it was confirmed that the plasticizer compositions according to the examples of the present invention can completely replace the DIDP.

In addition, Comparative Example 1-3 in which the terephthalate-based plasticizer was not used at all exhibited a decrease of approximately 5% or more in plasticization efficiency (hardness) and a decrease of approximately 10% or more in elongation rate compared to the examples, and poorer characteristics than the conventional products, and therefore, it was confirmed that Comparative Example 1-3 is highly inadequate to be a substitute for the conventional products.

Experimental Example 2: Evaluation of Physical Properties 2

Specimens were manufactured as described in Experimental Example 1 using the mixed plasticizer compositions of the examples and the comparative examples listed in Table 1 and evaluated for each test item. The results are shown in Table 4 below.

Comparative Examples 1-4 and 1-5 are prepared by additionally adding epoxidized soybean oil as a plasticizer to Examples 1-1 and 1-3, respectively. Referring to Table 4, when the epoxidized oil is added as a plasticizer, a decrease in physical properties can be clearly identified. It can be confirmed that Comparative Example 1-4 in which the epoxidized soybean oil is mixed, compared with Example 1-1, was decreased in tensile strength, elongation rate and the retention of elongation, and significantly degraded in the retention of tensile strength and low-temperature resistance.

The same result as described above can be shown for Example 1-3 and Comparative Example 1-5, and it may demonstrate that it is preferable not to use epoxidized oil in a plasticizer composition.

Experimental Example 3: Evaluation of Physical Properties 3

Specimens were manufactured as described in Experimental Example 1 using the mixed plasticizer compositions of the examples and the comparative examples listed in Table 2 and evaluated for each test item. The results are shown in Table 5 below.

TABLE 4

|  | Hardness (Shore "A") | Tensile strength (kg/cm²) | Retention of tensile strength (%) | Elongation rate (%) | Retention of elongation (%) | Low temperature resistance (° C.) |
|---|---|---|---|---|---|---|
| Example 1-1 | 92.0 | 164.3 | 111.6 | 301.3 | 78.5 | −29 |
| Comparative Example 1-4 | 91.6 | 160.2 | 95.6 | 287.3 | 75.1 | −23 |
| Example 1-3 | 89.2 | 172.6 | 105.0 | 314.5 | 96.4 | −32 |
| Comparative Example 1-5 | 89.5 | 170.0 | 92.5 | 295.8 | 89.3 | −27 |

TABLE 5

|  | Hardness (Shore "A") | Tensile strength (kg/cm$^2$) | Retention of tensile strength (%) | Elongation rate (%) | Retention of elongation (%) | Migration loss (%) | Low temperature resistance (° C.) |
|---|---|---|---|---|---|---|---|
| Example 2-1 | 91.3 | 164.6 | 100.9 | 293.3 | 83.0 | 1.98 | −31 |
| Example 2-2 | 90.7 | 166.2 | 102.6 | 297.3 | 85.2 | 1.73 | −30 |
| Example 2-3 | 89.4 | 159.6 | 112.8 | 309.3 | 82.3 | 1.66 | −31 |
| Example 2-4 | 89.9 | 168.5 | 102.5 | 303.3 | 82.7 | 1.80 | −30 |
| Example 2-5 | 91.0 | 168.9 | 102.0 | 305.7 | 88.5 | 1.88 | −31 |
| Example 2-6 | 87.2 | 162.8 | 98.0 | 325.4 | 86.4 | 0.88 | −35 |
| Example 2-7 | 87.5 | 169.8 | 103.5 | 308.4 | 88.0 | 0.73 | −35 |
| Example 2-8 | 91.0 | 173.4 | 102.3 | 310.0 | 92.5 | 1.32 | −33 |
| Comparative Example 2-1 | 91.3 | 158.7 | 95.6 | 280.1 | 74.3 | 1.79 | −28 |
| Comparative Example 2-2 | 94.5 | 167.0 | 96.5 | 281.0 | 85.1 | 5.65 | −28 |
| Comparative Example 2-3 | 95.0 | 150.2 | 88.2 | 275.3 | 80.6 | 6.50 | −27 |

Referring to Table 5, it was confirmed that Examples 2-1 to 2-8 exhibited all physical properties at the same or higher levels compared to Comparative Example 2-1, which is a conventional product. Therefore, when a citrate-based plasticizer is used in addition to a mixture of a terephthalate-based plasticizer and a trimellitate-based plasticizer, it can be confirmed that the resulting product can be used as a substitute for the conventional product without a decrease in a specific physical property, and physical properties are significantly improved.

In addition, it can be confirmed that Comparative Examples 2-2 and 2-3, in which only an additional citrate-based plasticizer, without a trimellitate-based plasticizer, was used, was significantly degraded in plasticization efficiency (hardness) and significantly decreased in migration loss, and also degraded in the retention of tensile strength, elongation rate and low-temperature resistance, compared with Examples 2-1 to 2-8.

Experimental Example 4: Evaluation of Physical Properties 4

Specimens were manufactured as described in Experimental Example 1 using the mixed plasticizer compositions of the examples and the comparative examples listed in Table 2 and evaluated for each test item. The results are shown in Table 6 below.

TABLE 6

|  | Hardness (Shore "A") | Tensile strength (kg/cm$^2$) | Retention of tensile strength (%) | Elongation rate (%) | Retention of elongation (%) | Migration loss (%) | Low temperature resistance (° C.) |
|---|---|---|---|---|---|---|---|
| Example 2-3 | 89.4 | 159.6 | 112.8 | 309.3 | 82.3 | 1.66 | −31 |
| Comparative Example 2-1 | 91.3 | 158.7 | 95.6 | 280.1 | 74.3 | 1.79 | −28 |
| Comparative Example 2-4 | 90.2 | 149.3 | 98.6 | 300.2 | 78.2 | 1.90 | −30 |

Comparative Example 2-4 was prepared by binding an acetyl group to the citrate-based plasticizer applied to Example 2-3 as a substitute for the citrate-based plasticizer of Example 2-3, and referring to Table 6, it is confirmed that all physical properties of Comparative Example 2-4 were degraded. That is, it can be confirmed that the tensile strength and the elongation rate were degraded, the plasticization efficiency was decreased (increased in hardness), and the retention of tensile strength and the retention of elongation were decreased. Further, as the acetyl group-binding plasticizer is applied, poorer physical properties than the conventional product in terms of migration loss and tensile strength were obtained. That is, it was confirmed that the use of the acetyl group-binding citrate-based plasticizer may result in damages in terms of physical properties as well as in economic and environmental aspects as described above.

While the present invention has been described in detail with reference to exemplary embodiments of the present invention, it should be understood by those of ordinary skill in the art that the scope of the present invention is not limited thereto and various forms of modification and alternation based on the fundamental ideas of the present invention defined by the accompanying claims are also included within the scope of the present invention.

The invention claimed is:

1. A plasticizer composition, consisting of:
   a terephthalate-based plasticizer; and
   a trimellitate-based plasticizer represented by Formula 1,
   wherein an epoxidized oil is not contained in the plasticizer composition, and
   wherein the terephthalate-based plasticizer and the trimellitate-based plasticizer are included at a weight ratio of 60:40 to 10:90, and
   wherein the terephthalate-based plasticizer is (a) one or more selected from the group consisting of dibutyl terephthalate (DBTP), diisopentyl terephthalate (DIPTP), dihexyl terephthalate (DHxTP), diisoheptyl terephthalate (DIHTP), di(2-propylheptyl) terephthalate (DPHTP), diisodecyl terephthalate (DIDTP), (2-ethylhexyl)isononyl terephthalate (EHINTP), (2-ethylhexyl)(2-propylheptyl) terephthalate, isononyl (2-propylheptyl) terephthalate, isodecyl isononyl terephthalate, (2-ethylhexyl)isodecyl terephthalate, isodecyl(2-propylheptyl) terephthalate, butyl(2-ethylhexyl) terephthalate, isoheptyl (2-ethylhexyl) terephthalate, isopentyl isononyl terephthalate, isopentyl(2-ethylhexyl) terephthalate, isopentyl(2-propylheptyl) terephthalate and butyl isoheptyl terephthalate; (b) a terephthalate composition of diinosonyl terephthalate, (2-ethylhexyl)isononyl terephthalate (EHINTP) and di(2-ethylhexyl) terephthalate at a weight ratio of approximately 10:50:40; or (c) a terephthalate composition of dibutyl terephthalate, butyl(2-ethylhexyl) terephthalate and di(2-ethylhexyl) terephthalate at a weight ratio of approximately 5:25:70:

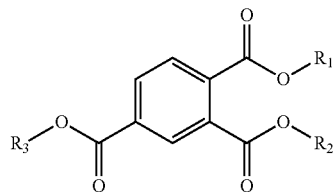

[Formula 1]

wherein, in Formula 1, $R_1$ to $R_3$ are each independently an alkyl group having 4 to 10 carbon atoms.

2. A plasticizer composition, consisting of:
a terephthalate-based plasticizer;
a trimellitate-based plasticizer represented by Formula 1; and
a citrate-based plasticizer represented by Formula 2,
wherein an epoxidized oil is not contained in the plasticizer composition,
wherein the terephthalate-based plasticizer and the trimellitate-based plasticizer are included at a weight ratio of 60:40 to 10:90,
wherein the terephthalate-based plasticizer is (a) one or more selected from the group consisting of dibutyl terephthalate (DBTP), diisopentyl terephthalate (DIPTP), dihexyl terephthalate (DHxTP), diisoheptyl terephthalate (DIHTP), di(2-propylheptyl) terephthalate (DPHTP), diisodecyl terephthalate (DIDTP), (2-ethylhexyl)isononyl terephthalate (EHINTP), (2-ethylhexyl)(2-propylheptyl) terephthalate, isononyl (2-propylheptyl) terephthalate, isodecyl isononyl terephthalate, (2-ethylhexyl)isodecyl terephthalate, isodecyl(2-propylheptyl) terephthalate, butyl(2-ethylhexyl) terephthalate, isoheptyl (2-ethylhexyl) terephthalate, isopentyl isononyl terephthalate, isopentyl(2-ethylhexyl) terephthalate, isopentyl(2-propylheptyl) terephthalate and butyl isoheptyl terephthalate; (b) a terephthalate composition of diinosonyl terephthalate, (2-ethylhexyl)isononyl terephthalate (EHINTP) and di(2-ethylhexyl) terephthalate at a weight ratio of approximately 10:50:40; or (c) a terephthalate composition of dibutyl terephthalate, butyl(2-ethylhexyl) terephthalate and di(2-ethylhexyl) terephthalate at a weight ratio of approximately 5:25:70:

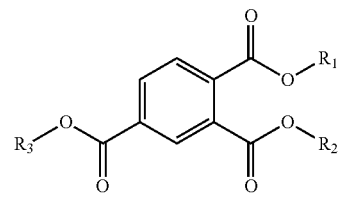

[Formula 1]

wherein, in Formula 1, $R_1$ to $R_3$ are each independently an alkyl group having 4 to 10 carbon atoms, and

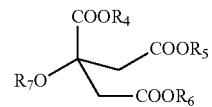

[Formula 2]

wherein, in Formula 2, $R_4$ to $R_6$ are each independently an alkyl group having 5 to 9 carbon atoms, and $R_7$ is hydrogen.

3. The plasticizer composition of claim 2, wherein the citrate-based plasticizer is included at 5 to 150 parts by weight with respect to 100 parts by weight of the sum of the weights of the terephthalate-based plasticizer and the trimellitate-based plasticizer.

4. The plasticizer composition of claim 1, wherein $R_1$ to $R_3$ in Formula 1 are each independently selected from the group consisting of a normal butyl group, an isobutyl group, a normal pentyl group, an isopentyl group, a normal hexyl group, a normal heptyl group, an isoheptyl group, a normal octyl group, an isooctyl group, a 2-ethylhexyl group, a normal nonyl group, an isononyl group, a 2-propylheptyl group, and an isodecyl group.

5. The plasticizer composition of claim 2, wherein $R_4$ to $R_6$ in Formula 2 are each independently selected from the group consisting of a pentyl group, an isopentyl group, a hexyl group, an isohexyl group, a heptyl group, an isoheptyl group, a normal octyl group, a 2-ethylhexyl group, a normal nonyl group and isononyl group.

6. A resin composition, comprising:
100 parts by weight of a resin; and
5 to 150 parts by weight of the plasticizer composition of claim 1,
wherein the resin composition includes an epoxidized oil in an amount of less than 1 parts by weight with respect to 100 parts by weight of the plasticizer composition.

7. The resin composition of claim 6, wherein the resin is selected from the group consisting of ethylene vinyl acetate, polyethylene, polypropylene, polyketone, polyvinyl chloride, polystyrene, polyurethane, and a thermoplastic elastomer.

8. A resin composition, comprising:
100 parts by weight of a resin; and
5 to 150 parts by weight of a plasticizer composition,
wherein the plasticizer composition consists of: a terephthalate-based plasticizer; and a trimellitate-based plasticizer represented by Formula 1, and
wherein the resin composition includes an epoxidized oil in an amount of less than 1 parts by weight with respect to 100 parts by weight of the plasticizer composition,
wherein the terephthalate-based plasticizer and the trimellitate-based plasticizer are included in the plasticizer composition at a weight ratio of 60:40 to 10:90, and wherein the terephthalate-based plasticizer is (a) one or more selected from the group consisting of dibutyl terephthalate (DBTP), diisopentyl terephthalate (DIPTP), dihexyl terephthalate (DHxTP), diisoheptyl terephthalate (DIHTP), di(2-propylheptyl) terephthalate (DPHTP), diisodecyl terephthalate (DIDTP), (2-ethylhexyl)isononyl terephthalate (EHINTP), (2-ethylhexyl)(2-propylheptyl) terephthalate, isononyl (2-propylheptyl) terephthalate, isodecyl isononyl terephthalate, (2-ethylhexyl)isodecyl terephthalate, isodecyl(2-propylheptyl) terephthalate, butyl(2-ethylhexyl) terephthalate, isoheptyl (2-ethylhexyl) terephthalate, isopentyl isononyl terephthalate, isopentyl(2-ethylhexyl) terephthalate, isopentyl(2-propylheptyl) terephthalate and butyl isoheptyl terephthalate; (b) a terephthalate composition of diinosonyl terephthalate, (2-ethylhexyl)isononyl terephthalate (EHINTP) and di(2-ethylhexyl) terephthalate at a weight ratio of approximately 10:50:40; or (c) a terephthalate composition of dibutyl terephthalate, butyl(2-ethylhexyl) terephthalate and di(2-ethylhexyl) terephthalate at a weight ratio of approximately 5:25:70:

[Formula 1]

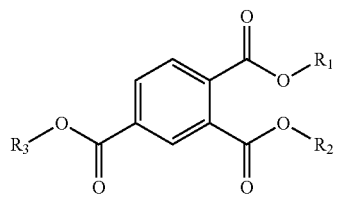

wherein, in Formula 1, $R_1$ to $R_3$ are each independently an alkyl group having 4 to 10 carbon atoms.

9. The plasticizer composition of claim 1, wherein the terephthalate-based plasticizer is one or more selected from the group consisting of dibutyl terephthalate (DBTP), diisopentyl terephthalate (DIPTP), dihexyl terephthalate (DHxTP), di(2-propylheptyl) terephthalate (DPHTP), (2-ethylhexyl)isononyl terephthalate (EHINTP) and butyl(2-ethylhexyl) terephthalate, and wherein $R_1$ to $R_3$ in Formula 1 are each independently selected from the group consisting of a normal butyl group, an isopentyl group, a normal hexyl group, a 2-ethylhexyl group, an isononyl group and a 2-propylheptyl group.

10. A resin composition, comprising:

100 parts by weight of a resin; and 5 to 150 parts by weight of the plasticizer composition of claim 2, wherein the resin composition includes an epoxidized oil in an amount of less than 1 parts by weight with respect to 100 parts by weight of the plasticizer composition.

11. The resin composition of claim 10, wherein the resin is selected from the group consisting of ethylene vinyl acetate, polyethylene, polypropylene, polyketone, polyvinyl chloride, polystyrene, polyurethane, and a thermoplastic elastomer.

* * * * *